US010623199B2

(12) United States Patent
Peterson et al.

(10) Patent No.: US 10,623,199 B2
(45) Date of Patent: Apr. 14, 2020

(54) OUTPUTTING AUDIO BASED ON USER LOCATION

(71) Applicant: LENOVO (Singapore) PTE. LTD., New Tech Park (SG)

(72) Inventors: Nathan J. Peterson, Oxford, NC (US); Brian Jules Jaeger, Wake Forest, NC (US); Joshua Neil Novak, Wake Forest, NC (US); Nicholas Richard Roberts, Cary, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 218 days.

(21) Appl. No.: 15/698,267

(22) Filed: Sep. 7, 2017

(65) Prior Publication Data
US 2019/0074991 A1    Mar. 7, 2019

(51) Int. Cl.
*H04L 12/28* (2006.01)
*H04W 4/029* (2018.01)
*G06F 3/16* (2006.01)
*H04W 4/33* (2018.01)

(52) U.S. Cl.
CPC .......... *H04L 12/2829* (2013.01); *G06F 3/165* (2013.01); *G06F 3/167* (2013.01); *H04L 12/282* (2013.01); *H04L 12/2812* (2013.01); *H04W 4/029* (2018.02); *H04W 4/33* (2018.02)

(58) Field of Classification Search
None
See application file for complete search history.

(56) References Cited

U.S. PATENT DOCUMENTS

| 9,251,787 | B1* | 2/2016 | Hart | G10L 15/22 |
| 10,080,088 | B1* | 9/2018 | Yang | H04S 7/30 |
| 2007/0066323 | A1* | 3/2007 | Park | G01S 5/02 455/456.2 |
| 2011/0157420 | A1* | 6/2011 | Bos | G10L 15/265 348/231.2 |
| 2014/0274144 | A1* | 9/2014 | Des Jardins | H04W 4/02 455/456.3 |
| 2014/0278438 | A1* | 9/2014 | Hart | G06F 3/167 704/275 |
| 2016/0266577 | A1* | 9/2016 | Kerzner | G05D 1/0022 |
| 2017/0076721 | A1* | 3/2017 | Bargetzi | G10L 15/22 |
| 2017/0092272 | A1* | 3/2017 | Bargetzi | G10L 15/22 |
| 2017/0238401 | A1* | 8/2017 | Sadwick | A61N 5/01 315/294 |
| 2017/0270803 | A1* | 9/2017 | High | B64C 39/02 |
| 2017/0361468 | A1* | 12/2017 | Cheuvront | A47L 9/2805 |
| 2018/0113577 | A1* | 4/2018 | Burns | G06F 16/739 |
| 2018/0204574 | A1* | 7/2018 | Hart | G10L 15/22 |
| 2018/0213291 | A1* | 7/2018 | Roman | H04N 21/47217 |
| 2018/0232201 | A1* | 8/2018 | Holtmann | G06K 9/00362 |

\* cited by examiner

*Primary Examiner* — Edan Orgad
*Assistant Examiner* — Emmanuel K Maglo
(74) *Attorney, Agent, or Firm* — Kunzler Bean & Adamson

(57) ABSTRACT

For outputting audio based on a user's location, an apparatus is disclosed. A system, method, and program product also perform the functions of the apparatus. The apparatus for outputting audio based on a user's location includes a processor and a memory that stores code executable by the processor. The processor receives an audible command to output audio and associates the audible command with a particular user. Additionally, the processor monitors a location of the particular user and output audio, based on the command, from a device nearest a location of the particular user.

20 Claims, 7 Drawing Sheets

OUTPUTTING AUDIO BASED ON USER LOCATION

FIELD

The subject matter disclosed herein relates to audio output and more particularly relates to outputting audio based on a user's location.

BACKGROUND

Electronic devices providing a digital personal assistant can be configured to send audio output to a user at designated times. However, if a user is in a different location at a designated time, they are unable to hear the audio output.

BRIEF SUMMARY

An apparatus for outputting audio based on a user's location is disclosed. A method and computer program product also perform the functions of the apparatus.

One apparatus for outputting audio based on a user's location includes a processor and a memory. The memory stores code executable by the processor. The processor receives an audible command to output audio and associates the audible command with a particular user. The processor also monitors a location of the particular user and outputs audio, based on the command, from a device nearest a location of the particular user.

In certain embodiments, outputting audio from a device nearest a location of the particular user includes the processor identifying the device nearest a location of the particular user and transferring the audible command to the identified device. In some embodiments, the audible command to output audio is a command to output a notification at a certain time. Here, outputting audio based on the command from a device nearest a location of the particular user includes the processor transferring the command to output the notification at the certain time to the device nearest the location of the particular user.

In certain embodiments, associating the audible command with the particular user includes the processor identifying the particular user from voice analysis of the audible command. In further embodiments, monitoring the location of the particular user includes the processor receiving additional audio data from one or more of a plurality of stationary digital personal assistant devices and determining that the user is located in a particular room of a plurality of rooms based on the additional audio data. In such embodiments, each stationary digital personal assistant device is located in a different one of the plurality of rooms.

In some embodiments, the apparatus includes a camera device that captures image data. In such embodiments, associating the audible command with the particular user includes the processor identifying the particular user from image data in response to receiving the audible command to output audio. In certain embodiments, monitoring the location of the particular user includes the processor receiving image data from one or more of a plurality of stationary digital personal assistant devices and determining that the user is located in a particular room of a plurality of rooms based on the additional image data. In such embodiments, each stationary digital personal assistant device is located in a different one of the plurality of rooms.

One method for outputting audio based on a user's location includes receiving an audible command to output audio and associating, by use of a processor, the audible command with a particular user. The method includes monitoring a location of the particular user and outputting audio based on the command from a device nearest a location of the particular user.

In certain embodiments, associating the audible command with the particular user includes identifying the particular user from voice analysis of the audible command. In some embodiments, receiving the audible command to output audio includes receiving a command to output streaming audio content at a first device. In such embodiments, outputting audio based on the command from a device nearest a location of the particular user may include transferring the command to output streaming audio content to a second device nearest the location of the particular user, the second device being located in a different room than the first device.

In some embodiments, the method also includes capturing image data in response to receiving the audible command to output audio. In such embodiments, associating the audible command with the particular user includes identifying the particular user from image data. Additionally, monitoring the location of the particular user may include determining that the user is located in a particular room of a plurality of rooms based on the image data. In certain embodiments, receiving the image data includes receiving image data from one or more of a plurality of stationary digital personal assistant devices. Here, each stationary digital personal assistant device is located in a different one of the plurality of rooms.

In certain embodiments, monitoring the location of the particular user includes receiving additional audio data and determining that the user is located in a particular room of a plurality of rooms based on the additional audio data. In further embodiments, receiving the additional audio data may include receiving audio data from one or more of a plurality of stationary digital personal assistant devices. In such embodiments, each stationary digital personal assistant device is located in a different one of the plurality of rooms.

In certain embodiments, determining that the user is located in a particular room of a plurality of rooms based on the additional audio data includes detecting the users voice in the audio data of a particular one of the plurality of stationary digital personal assistant devices and determining that the user is located in the room associated with the particular one of the plurality of stationary digital personal assistant devices. In further embodiments, outputting audio from a device nearest a location of the particular user may include instructing a mobile digital personal assistant device associated with the particular user to output the audio in response to determining that the user is not located in any of the plurality of rooms containing a stationary digital personal assistant device.

One program product for outputting audio based on a user's location includes a computer readable storage medium that stores code executable by a processor. Here, the executable code includes code to: receive an audible command to output audio, correlate the audible command with a particular user, track a location of the particular user, and output audio based on the command from a device nearest a location of the particular user.

In certain embodiments, the audible command is received at a first device and the audio is output at a second device located in a different room than the first device. In some embodiments, the audible command to output audio is a command to output a notification at a specified time. In such embodiments, outputting audio based on the command from a device nearest a location of the particular user includes monitoring a current time and outputting the notification at the device nearest the location of the particular user in response to the current time matching the specified time.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
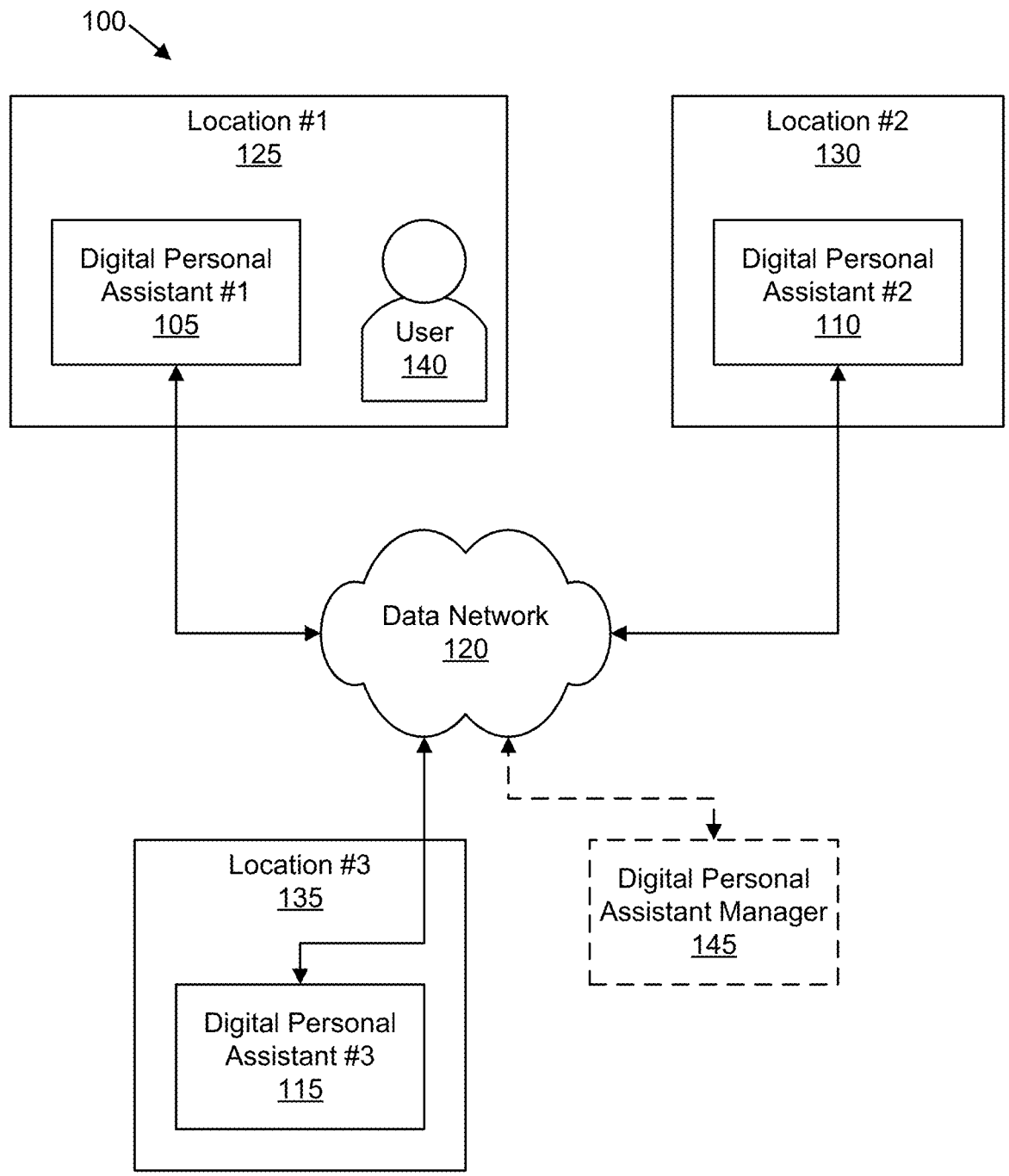
FIG. 1 is a schematic block diagram illustrating one embodiment of a system for outputting audio based on a user's location.

As will be appreciated by one skilled in the art, aspects of the embodiments may be embodied as a system, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium that is not a transitory signal. Said computer readable storage medium may be a storage device storing the code. The storage device may be, for example, but not limited to, an electronic storage device, magnetic storage device, optical storage device, electromagnetic storage device, infrared storage device, holographic storage device, micromechanical storage device, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These codes may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

The present disclosure describes systems, apparatus, and method for outputting audio based on a user's location. Generally, when a user sets an alarm on one digital personal assistant ("DPA") device of a set DPA devices, and the user moves to another room, location, etc., then the DPA devices alert the user at the designated time and from a DPA device at the new location the user is now located. For example, if a user sets a wake-up alarm from the kitchen, they want the DPA devices to wake them up in the bedroom the next day.

Accordingly, the set of DPAs track the user's movement between the several DPA devices. Tracking the user's location may be done by listening to the user's voices, analyzing camera data, tracking their wearable devices, etc. In one embodiment, the user may announce their current location to a nearby DPA device once they enter the new area. At the designated time, the DPA device nearest the user will output the alarm.

In some embodiments, the user may be actively listening to audio output (streaming radio) from their DPA device. Here, the active audio output may follow the user around between their multiple DPA devices.

FIG. 1 depicts a system 100 for outputting audio based on a user's location, according to embodiments of the disclosure. The system 100 includes a first digital personal assistant ("DPA") device 105 located a first monitored location 125, a second DPA device 110 located in a second monitored location 130, a third DPA device 115 located in a third monitored location 135, and a data network 120 communicatively coupling the DPA devices 105-115. In some embodiments, the system 100 may optionally include a DPA manager 145 and/or a mobile DPA 150. Each of the locations 125-135 is a monitored location due to the presence of a corresponding DPA device 105-115. While a specific number of DPA devices 105-115 and monitored locations 125-135 are depicted, in other embodiments the number of DPA devices and locations may be greater or fewer than those shown in FIG. 1.

Each of the DPA devices 105-115 is an electronic device hosting a digital personal assistant client. Generally, the DPA devices 105-115 are stationary in that they are not worn or carried on the person of the user 140. In contrast, a mobile DPA device 150 is a mobile device hosting a digital personal assistant client, such as a smart phone or smart wearable device, that is typically worn or carried on the person of the user 140. As discussed in greater detail below, a DPA device 105-115 may transfer an audible command to a mobile DPA device 150 when the user 140 is no longer located within any of the monitored locations 125-135.

The DPA devices 105-115 are each configured to receive an audible command to output audio and associate the audible command with a particular user (e.g., the user 140). Various means for identifying a user with which to associate the audible command are discussed below with reference to FIG. 2. Here, the audible command may be a location-tracking command. As used herein, a "location-tracking command" refers to command from the user 140 to perform an action and "follow" the user 140, wherein the DPA devices 105-115 (or the DPA manager 145) are to track the location of the user 140 and perform the action at a DPA device 105-115 corresponding to the current location of the user.

Accordingly, the DPA devices 105-115 also monitor a location of the particular user (user 140). In certain embodiments, the DPA devices 105-115 collaboratively monitor the location of the user 140 using one or more of audio data, image data, and wireless signal data. Here, each DPA device 105-115 is capable of determining whether the user 140 was within a monitored location corresponding to that DPA device. Each DPA device 105-115 may respond to queries from others of the DPA devices 105-115 and share data indicative of the user's location. Further, the DPA devices 105-115 are each configured to identify a DPA device nearest the location of the user 140, wherein the nearest DPA device 105-15 outputs audio based on the command.

The data network 120, in one embodiment, is a telecommunications network configured to facilitate electronic communications, for example among the DPA devices 105-115. The data network 120 may be comprised of wired data links, wireless data links, and/or a combination of wired and wireless data links. Examples of wireless data networks include, but are not limited to, a wireless cellular network, a local wireless network, such as a Wi-Fi® network, a Bluetooth® network, a near-field communication ("NFC") network, an ad hoc network, and/or the like.

In certain embodiments, the data network 120 forms a local area network ("LAN") or a wireless local area network ("WLAN"). In one embodiment, DPA devices on the same LAN (or WLAN) are associated with one another. In another embodiment, the DPA devices 105-115 may form a peer-to-peer network (such as a "workgroup" network) were files, network connections (e.g., an Internet connection), and other computing resources are shared among members of the peer-to-peer network. For example, the data network 120 may be an ad hoc network formed by the DPA devices 105-115.

In some embodiments, the data network 120 may include a wide area network ("WAN"), a storage area network ("SAN"), a LAN, an optical fiber network, the internet, or other digital communication network. In some embodiments, the data network 120 may include two or more networks. The data network 120 may include one or more servers, routers, switches, and/or other networking equipment. The data network 120 may also include computer readable storage media, such as a hard disk drive, an optical drive, non-volatile memory, random access memory ("RAM"), or the like.

The system 100 may optionally include a digital personal assistant ("DPA") manager 145 that receives an audible command to output audio (e.g., from one of the DPA devices 105-115), correlates the audible command with a particular user (e.g., the user 140), tracks a location of the particular user (e.g., via the DPA devices 105-115), and outputs audio based on the command from a device nearest a location of the particular user (e.g., by identifying the nearest DPA device and instructing that device to output the audio).

In such embodiments, the DPA manager 145 tracks the location of the user 140 by receiving data (e.g., audio data, image data, wireless signal data, etc.) and/or receiving user location reports from the various DPA devices 105-115. For example, a DPA device 105-115 may send a user location report in response to an event, such as detecting that the user 140 enters or leaves the location 125-135 corresponding to the DPA device 105-115. As another example, a DPA device 105-115 may periodically send a user location report indicating where the user is present or absent in the location 125-135 corresponding to the DPA device 105-115.

From the user location reports, the DPA manager 145 identifies the current location of the user 140 (e.g., one of the locations 125-135) and further identifies a DPA device corresponding to that location (e.g., one of the DPA devices 105-115). The DPA manager 145 then sends an instruction to identify DPA device to output audio based on the received audible command.

In a first example, the user 140 may issue an audible command to output a notification at a specified time. Here, the first DPA device 105 may receive this audible command. As described above, the DPA devices 105-115 may collaboratively track the location of the user or the DPA manager 145 may track the location of the user using sensor inputs from the DPA devices 105-115. At the specified time, the DPA device 105-115 nearest the current location of the user 140 outputs the notification. In certain embodiments, the second DPA device 110 or the third DPA device 115 may output the notification to the user 140 being located in the second location 130 or the third location 135 at the specified time.

In a second example, the user 140 may issue an audible command to output streamed audio content (e.g., internet radio). Here, the first DPA device 105 may receive this audible command. As described above, the DPA devices 105-115 may collaboratively track the location of the user or the DPA manager 145 may track the location of the user using sensor inputs from the DPA devices 105-115. As the user moves from the first location 1252 either the second location 130 or the third location 135, the second DPA device 110 or the third DPA device 115 may begin outputting the streamed audio content (and the first DPA device 105 stop outputting the streamed audio content) in response to the user 140 being located in the second location 130 or the third location 135.

Figure 2:
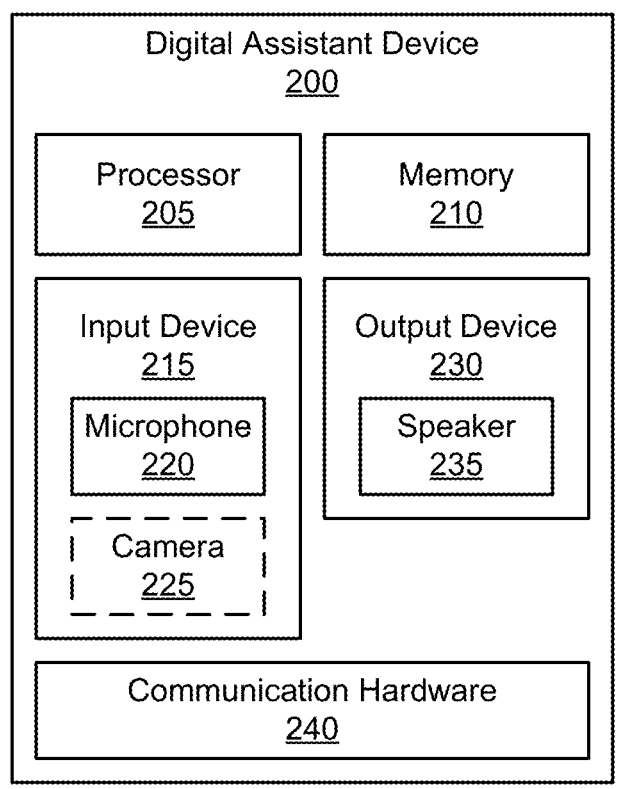
FIG. 2 is a schematic block diagram illustrating one embodiment of an apparatus for outputting audio based on a user's location.

FIG. 2 depicts a digital assistant apparatus 200 for outputting audio based on a user's location, according to embodiments of the disclosure. The digital assistant apparatus 200 may be one embodiment of the digital personal assistant device 105, described above. Alternatively, the digital assistant apparatus 200 may be one embodiment of the digital personal assistant manager 145, described above. In some embodiments, the digital assistant apparatus 200 is a user terminal device, such as a DPA device, personal computer, terminal station, laptop computer, desktop computer, tablet computer, smart phone, personal digital assistant, and the like. The digital assistant apparatus 200 includes a processor 205, a memory 210, an input device 215, an output device 230, and communication hardware 240.

The processor 205, in one embodiment, may comprise any known controller capable of executing computer-readable instructions and/or capable of performing logical operations. For example, the processor 205 may be a microcontroller, a microprocessor, a central processing unit (CPU), a graphics processing unit (GPU), an auxiliary processing unit, a FPGA, an integrated circuit, or similar controller. In certain embodiments, the processor 205 may include multiple processing units, such as multiple processing cores, multiple CPUs, multiple microcontrollers, or the like. In some embodiments, the processor 205 executes instructions stored in the memory 210 to perform the methods and routines described herein. The processor 205 is communicatively coupled to the memory 210, input device 215, output device 230, and communication hardware 240.

In some embodiments, the processor 205 receives an audible command to output audio and associates the audible command with a particular user. The processor 205 also monitors (e.g., tracks) the location of the particular user and outputs audio, based on the command, from a device nearest a location of the particular user.

Receiving the audible command may include the processor 205 receiving data corresponding to the audible command. In one embodiment, the data is audio data received from an audio input device, such as a microphone 220 communicatively coupled to the processor 205. In another embodiment, the data is a digital command containing one or more parameters derived from the audible command. Here, the audible command may be received and processed by another device and then sent to the processor 205. Accordingly, receiving the audible command may include the processor 205 receiving a predefined command from a networked device.

In order to associate the audible command with a particular user, the processor 205 identifies the user giving the audible command. In certain embodiments, the processor 205 associates the audible command with a particular user by analyzing the audible command (e.g., performing voice analysis) to identify the user. In one embodiment, the user may identify herself by name in the audible command. Here, the processor 205 correlates the spoken name with a particular user.

In some embodiments, the processor 205 analyzes image data in response to receiving the audible command in order to identify the user giving the command. For example, the processor 205 may control the camera 225 to capture image data in response to receiving the audible command and may analyze the capture data to identify the user. In further embodiments, processor 205 may analyze wireless signal data (e.g., RFID signals) to identify the user. Where the audible command is received and processed by another device, the processor 205 may parse the command received from another device for parameter identifying user. In other embodiments, the command received from the other device may include image data and/or voice data usable by the processor 205 to identify the user issuing the command.

In order to monitor/track the location of the particular user, the processor 205 identifies a current location of the user. In various embodiments, the location of the user is defined with respect to one or more rooms. For example, the digital assistant apparatus 200 may be located in a particular room of a house, office, or other structure. The processor 205 may periodically verify that the user is in the same room as the digital assistant apparatus 200. As discussed in more detail below, the processor 205 may use audio data, image data, and/or wireless signaling to determine a room in which the users located. Upon determining that the user is no longer located in the same room as the digital assistant apparatus 200, the processor 205 determines a new current location of the user, also as discussed below.

In some embodiments, the processor 205 determines the current location of the user by analyzing audio data and/or image data. For example, the processor 205 may receive audio data (e.g., in addition to the audio data corresponding to the audible command) and analyze the audio data to determine whether the user is in the same room as the digital assistant apparatus 200. The audio data may be sampled periodically or may be received continuously. Here, voice analysis may be performed on the audio data and the processor 205 determines the likelihood that the user is in the same room as the digital assistant apparatus 200.

Where the user's voice is detected within the audio data, then it is more likely that the user is in the same room as the digital assistant apparatus 200. However, if the user's voice is not detected within the audio data (e.g., for a predetermined period of time), then it is less likely that the user is in the same room as the digital assistant apparatus 200. Once the likelihood that the user is in the same room as the digital assistant apparatus 200 drops below a certain value (e.g., for a predetermined period of time), then the processor 205 determines that the user is no longer in the same room as the digital assistant apparatus 200.

As another example, the processor 205 may receive image data and analyze the image data to determine whether the user is in the same room as the digital assistant apparatus 200. The received image data may be in addition to any image data used to identify the user issuing the audible command. In certain embodiments, the image data may be sampled periodically, such as every second, every 5 seconds, every 10 seconds, etc. In other embodiments, the image data may be continuously received and analyzed. Here, image analysis, such as face detection and recognition, may be performed on the image data. Where the user is not detected within the image data (e.g., for a predetermined period of time), then the processor 205 may determine that the user is no longer in the same room as the digital assistant apparatus 200.

In some embodiments, the processor 205 determines the current location of the user by receiving wireless signals from a device associated with the particular user, such as an electronic device worn or carried by the user. Examples of wireless signals usable to locate the user include, but are not limited to, radiofrequency signals, infrared signals, ultrasonic signals, and the like. As an example, the digital assistant apparatus 200 may include an RFID reader and a particular user may wear/carry an RFID tag, such that the processor 205 tracks the location of the particular user using the RFID tag.

As another example, the processor 205 may track the location of the particular user by detecting the presence of a mobile device worn/carried by the user via the wireless signals. Here, the mobile device may use Bluetooth, Wi-Fi, or other short- or medium-range wireless communication to connect to the digital assistant apparatus 200, wherein the processor 205 detects the presence of the mobile device through the establishment of the wireless connection. In yet another example, the processor 205 may listen for (e.g., detect) a predetermined wireless signal from the mobile device, such as a response to a poll from the digital assistant apparatus 200. Where the user is not detected via the wireless signals (e.g., for a predetermined period of time), then the processor 205 may determine that the user is no longer in the same room as the digital assistant apparatus 200.

The processor 205 acquires additional data when determined that the user is no longer in the same room as the digital assistant apparatus 200 (or responsive to the likelihood of the user being in the same room reaching a threshold value), in order to identify a current location of the particular user. In certain embodiments, the processor 205 acquires additional data from additional sensors of the digital assistant apparatus 200 (or communicatively coupled to the digital assistant apparatus 200). For example, where the processor 205 determines that the users no longer in the same room based on audio data received from an audio sensor (e.g., the microphone 220), then the processor 205 may acquire image data and/or data from wireless sensors (e.g., monitoring for wireless signals indicating the presence of the user). In this manner, the processor 205 may verify that the user is not in the same room by using the additional data from the additional sensors of the digital assistant apparatus 200.

In some embodiments, the processor 205 acquires additional data from one or more network devices in response to determining that the user is no longer in the same room. As discussed above, the digital assistant apparatus 200 may be networked with one or more digital personal assistant ("DPA") devices located in other rooms. Thus, when the processor 205 determines users no longer in the same room as the digital assistant apparatus 200, the processor 205 may query other DPA devices located on the same local area network or associated with the same user account for additional data indicative of the location of the particular user.

In one embodiment, the processor 205 receives audio data from one or more (stationary) DPA devices, with each stationary DPA device is located in a different one of the plurality of rooms. The processor 205 may then determine that the user is located in a particular room based on the additional audio data. Where audio data from multiple devices indicates the presence of particular user (e.g., where multiple DPA devices detect the user's voice), the processor 205 may request the type of data (e.g., image data) to determine the user's location or may analyze volume levels (e.g., audio signal strength) and associated the user's location with a DPA device detecting the highest volume levels.

In another embodiment, the processor 205 receives image data from one or more DPA devices (each associated with a particular room) and determines that the user is located in a particular room based on the additional image data. In still another embodiment, the processor 205 may receive wireless signal data from one or more DPA devices. Again, the processor 205 determines a room in which the user is located based on the wireless signal data. Where multiple DPA devices detect wireless signals from the user, the processor 205 may request another type of data (e.g., image data) or may analyze wireless signal strengths to determine the user's location.

In certain embodiments, the processor 205 queries each networked device (e.g., DPA device), asking whether the particular user is located in the room associated with that network device. In such embodiments, the queried device will analyze audio data, image data, and/or wireless signal data to determine whether the particular user is located in the room associated with that device. The queried device will then respond to the processor 205 with an indication (e.g., positive or negative) of whether the particular user is present. This approach distributes the burden of identifying the user's current location to the plurality of network devices.

Still further, the processor 205 may transmit a user location report to one or more networked DPA devices. In one embodiment, the user location report indicates whether the user is present or absent within an area monitored by the digital assistant apparatus 200. In another embodiment, the user location report indicates that the user has entered or left the area monitored by the digital assistant apparatus 200.

In some embodiments, the processor 205 is unable to determine a current location of the user. For example, the user may no longer be within range of any of the networked DPA devices. Where the processor 205 is unable to determine the current location, it may set the user's current location as "unknown," with certain behaviors triggered by the "unknown" user location.

As will be apparent to one of skill in the art, the processor 205 may use a combination of the above approaches to track/monitor the location of the particular user. For example, the processor 205 may be constantly monitoring audio data in order to receive and perform a command from a user. Here, the processor 205 may use the audio data to monitor the user's location and may supplement audio data with image data, wireless signal data, and the like. Such an approach may prove the accuracy of the user's current location.

In order to output audio from the nearest device, the processor 205 determines which device (of a plurality of devices) is closest to the tracked user. In certain embodiments, outputting audio from a device nearest a location of the particular user includes the processor 205 identifying the device nearest a location of the particular user and transferring the audible command to the identified device. For example, the processor 205 may be part of a first DPA device associated with the first room and may determine that the particular user is currently in the second room. The processor 205 may then identify a second DPA device associated with the second room and transfer the audible command to the second DPA device.

In one embodiment, the audible command is command to play audio (e.g., music) streamed from a network location. Here, the streamed audio should be played only in the room where the users located. Thus, when a particular user moves from the first room to the second room, the processor 205 transfers the command to stream audio such that the streamed audio ceases playing from the first DPA device and begins playing from the second DPA device. In another embodiment, the audible command is command to provide a notification at a certain time or in response to certain condition. Here, the notification should be presented only from advice near the user. Thus, when the particular user moves from the first room to the second room, the processor 205 transfers the notification command to the second DPA device such that when the time (or the condition) associated with the notification is met, the second DPA device (located in the same room as the user) is the only device presenting the notification.

The memory 210, in one embodiment, is a computer readable storage medium. In some embodiments, the memory 210 includes volatile computer storage media. For example, the memory 210 may include a random-access memory (RAM), including dynamic RAM (DRAM), synchronous dynamic RAM (SDRAM), and/or static RAM (SRAM). In some embodiments, the memory 210 includes non-volatile computer storage media. For example, the memory 210 may include a hard disk drive, a flash memory, or any other suitable non-volatile computer storage device. In some embodiments, the memory 210 includes both volatile and non-volatile computer storage media.

In some embodiments, the memory 210 stores data relating to outputting audio based on a user's location. For example, the memory 210 may store audible commands, voice prints, image data, user profiles, the current user location, identities of networked devices, and the like. In some embodiments, the memory 210 also stores executable code and related data, such as an operating system or other controller algorithms operating on the digital assistant apparatus 200.

The input device 215, in one embodiment, may comprise any known computer input device including a touch panel, a button, a keyboard, a microphone, a camera, and the like. For example, the input device 215 includes a microphone 220 or similar audio input device with which a user inputs audio data (e.g., audible commands). In some embodiments, the input device 215 may include a camera 225, or other imaging device, that captures image data. As described above, the image data may be used to associate an audible command with a particular user and/or to determine whether the particular user is located in a particular room. In some embodiments, the input device 215 comprises two or more different devices, such as the microphone 220 and a button.

The output device 230, in one embodiment, is configured to output visual, audible, and/or haptic signals. In some embodiments, the output device 230 includes an electronic display capable of outputting visual data to a user. For example, the output device 230 may include an LCD display, an LED display, an OLED display, a projector, or similar display device capable of outputting images, text, or the like to a user. In certain embodiments, the output device 230 includes one or more speakers 235 for producing sound, such as an audible alert/notification or streamed audio content. In some embodiments, the output device 230 includes one or more haptic devices for producing vibrations, motion, or other haptic output.

In some embodiments, all or portions of the output device 230 may be integrated with the input device 215. For example, the input device 215 and output device 230 may form a touchscreen or similar touch-sensitive display. As another example, the input device 215 and output device 230 may form a display that includes haptic response mechanisms. In other embodiments, the output device 230 may be located near the input device 215. For example, a camera 225, microphone 220, speaker 235, and touchscreen may all be located on a common surface of the digital assistant apparatus 200. The output device 230 may receive instructions and/or data for output from the processor 205 and/or the communication hardware 240.

The communication hardware 240, in one embodiment, is configured to send and to receive electronic communications. The communication hardware 240 may communicate using wired and/or wireless communication links. Further, the communication hardware 240 may be used to receive wireless signal data. In some embodiments, the communication hardware enables the digital assistant apparatus 200 to communicate via the data network 120. The digital assistant apparatus 200 may also include communication firmware or software, including drivers, protocol stacks, and the like, for sending/receiving the electronic communications.

In certain embodiments, the communication hardware 240 includes a wireless transceiver capable of exchanging information via electromagnetic radiation (e.g., communication via radio frequencies, infrared, visible light, and the like) or sound (e.g., ultrasonic communication). In one embodiment, the wireless transceiver acts as a wireless sensor for detecting wireless signals. As discussed above, the communication hardware 240, in conjunction with the processor 205, may be used to identify the particular user and/or detect location of the particular user by receiving wireless signals, such as radio signals, ultrasonic signals, infrared signals, and the like. In certain embodiments, the communication hardware 240 includes a wired transceiver capable of exchanging information via a transmission line (e.g., wire, data cable, or optical fiber).

Figure 3:
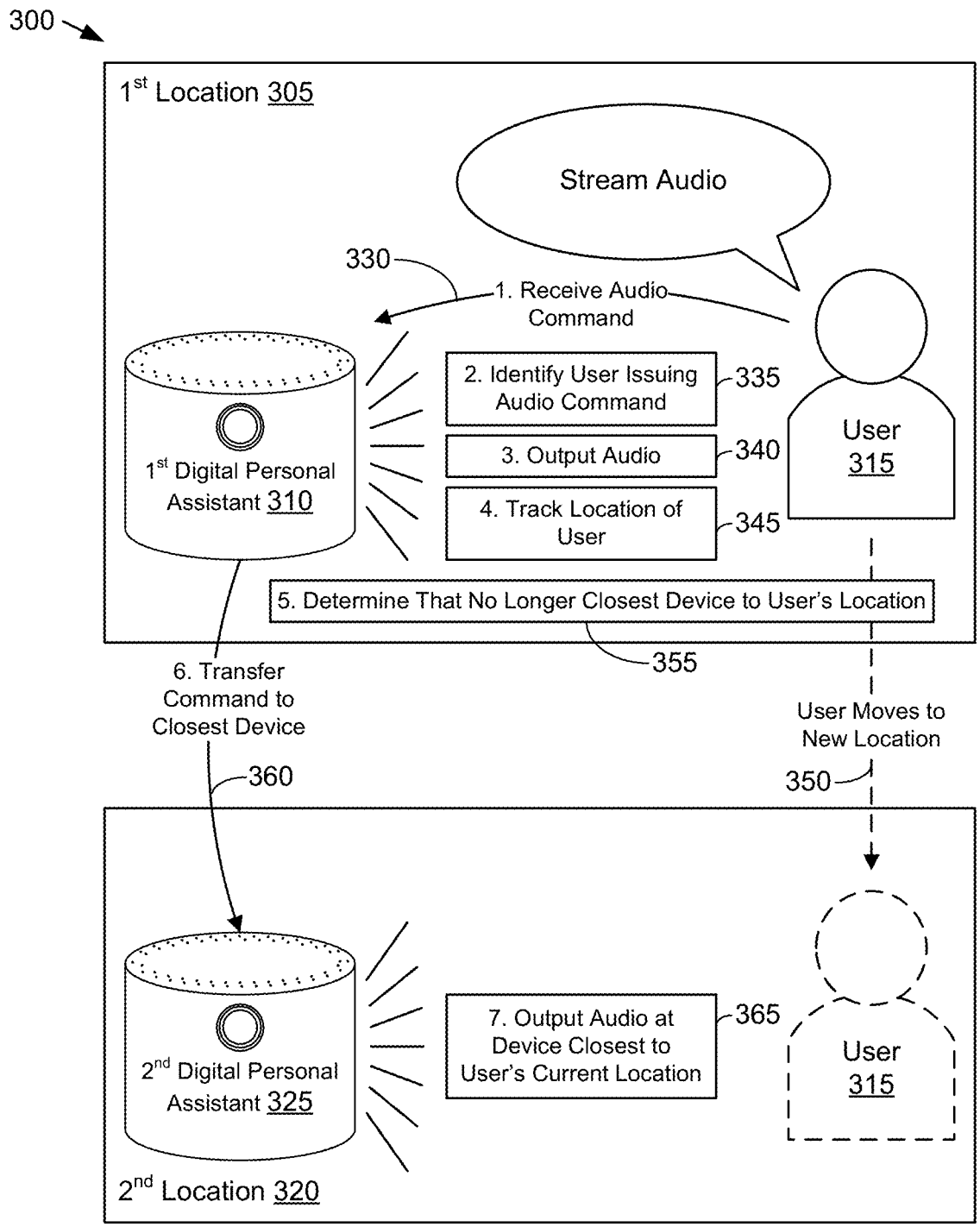
FIG. 3 is a diagram illustrating one embodiment of outputting audio based on a user's location.

FIG. 3 depicts a procedure 300 for outputting audio based on a user's location, according to embodiments of the disclosure. The procedure 300 involves a first digital personal assistant 310 at a first location, a second digital personal assistant 325 at a second location 320, and a user 315. The first digital personal assistant 310 and the second digital personal assistant 325 are digital personal assistant ("DPA") devices and may be embodiments of the digital assistant apparatus 200, described above. Further, the first digital personal assistant 310 and the second digital personal assistant 325 are communicatively coupled to each other, for example via a local area network.

As depicted, the user 315 is initially at the first location 305. Here, the user 315 interacts with first digital personal assistant 310, instructing the first digital personal assistant 310 to stream audio. As the first digital personal assistant 310 is listening for audible commands, the first digital personal assistant 310 receives the audible command (see action 330). Upon receiving the audible command, the first digital personal assistant 310 identifies the user issuing the audio command (see action 335). Further, the first digital personal assistant 310 processes the audible command, resulting in the first digital personal assistant 310 outputting audio pursuant to the command to "stream audio" (see action 340).

Additionally, the first digital personal assistant 310 tracks the location of the user 315 (see action 345). As described above, a digital personal assistant (such as the first digital personal assistant 310) may track the location of the user using audio data, image data, wireless signal data, and the like. At some point in time, the user 315 moves to a new location (see action 350). By tracking the location of the user 315, the first digital personal assistant 310 determines that the user 315 is no longer at the first location 305 and that the first digital personal assistant 310 is no longer the closest DPA device to the current location of the user 315 (see action 355).

The first digital personal assistant 310 identifies a DPA device closest to the users and transfers the audible command to identify device (see action 360). In certain embodiments, the first digital personal assistant 310 stops streaming audio in response to transferring the audible command to the new DPA device. In the depicted embodiment, the first digital personal assistant 310 determines that the second digital personal assistant 325 is the closest DPA device.

Accordingly, the second digital personal assistant 325 receives the transferred command from the first digital personal assistant 310. As the audible command is to "stream audio," the second digital personal assistant 325 (as the DPA device closest to the user's current location) outputs audio based on audible command (see action 365). The second digital personal assistant 325 also tracks the location of the user 315.

Although not shown in FIG. 3, the user 315 may travel to one or more additional locations. In one embodiment, the user 315 may travel to an area (e.g., room) associated with a third DPA device. Here, the second digital personal assistant 325 transfers the audible command to their DPA device. In another embodiment, the user 315 may travel to an area that is not associated with any DPA device for example, the user 315 may travel to room where no digital system device is located. In such an embodiment, the second digital personal assistant 325 may cease streaming audio upon determining that the user 315 is absent from the second location 320 or has been absent from the second location 320 for a predetermined amount of time. In a further embodiment, the second digital personal assistant 325 may periodically attempt to locate the user 315 and may either stream audio again or transfer the audible command to another device in response to locating the user 315.

While FIG. 3 is described in terms of the first digital personal assistant 310 and second digital personal assistant 325 identifying the user issuing the audible command, tracking the location of the user, and determining a closest device to the user's current location, in other embodiments a digital personal assistant manager (such as the DPA manager 145) magnify the user issuing audible command, track the location of the user, and determine a closest device to the user's current location.

Figure 4:
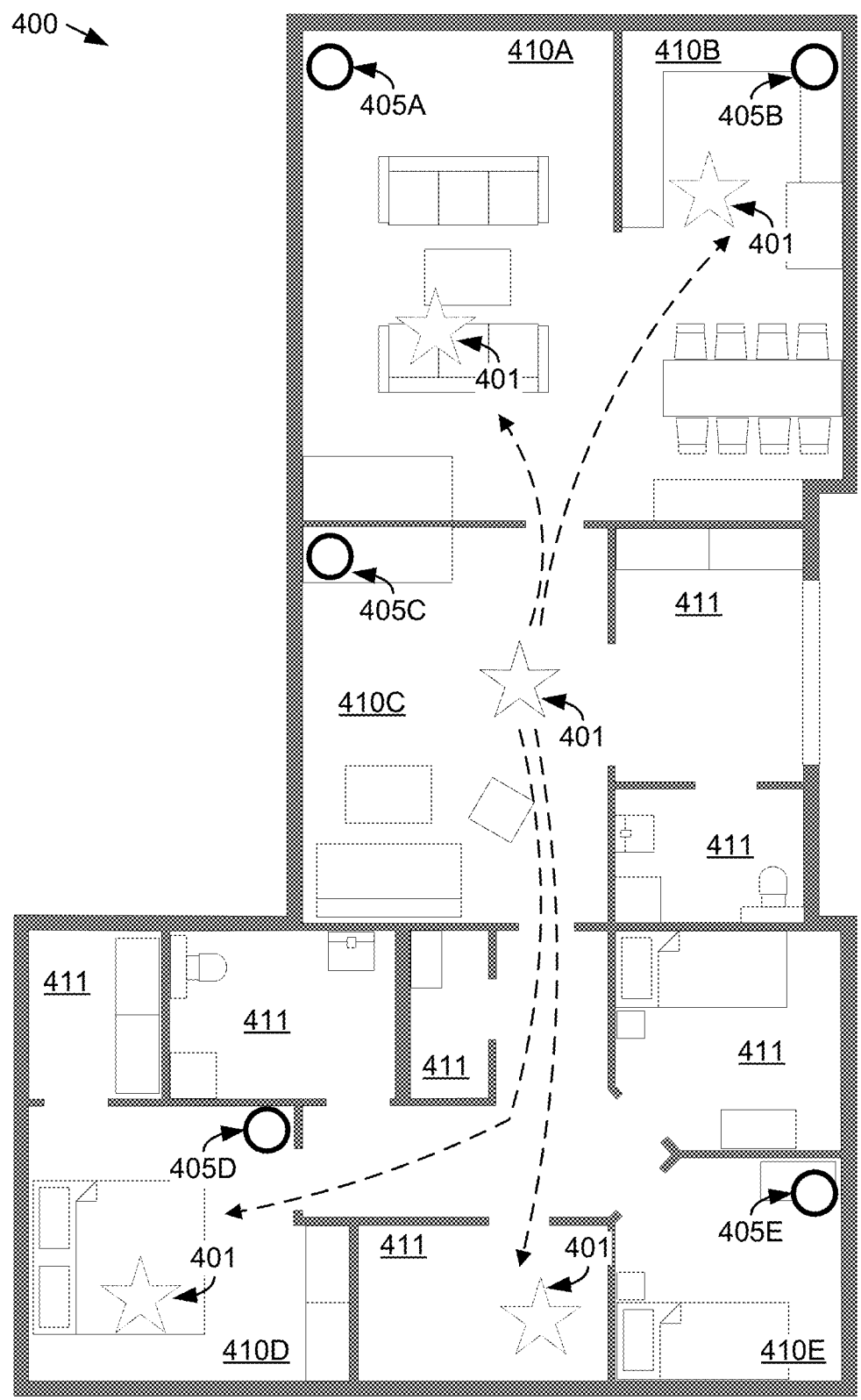
FIG. 4 is a schematic diagram illustrating one embodiment of a home containing multiple digital personal assistant devices for outputting audio based on a user's location.

FIG. 4 depicts a floor plan of a home 400 for outputting audio based on a user's location, according to embodiments of the disclosure. As depicted, the home 400 includes a plurality of rooms, including monitored rooms 410A-E and unmonitored rooms 411. Each of the monitored rooms 410A-E (collectively referred to as "monitored rooms 410") includes one of the digital personal assistant ("DPA") devices 405A-E (collectively referred to as "DPA devices 405"). Note that some rooms of the home 400 are not monitored because no DPA device 405 is located therein. Each DPA device 405 listens for audible commands and/or monitors the location of the user 401. The DPA devices 405 may be embodiments of the digital assistant apparatus 200, described above. Further, the DPA devices 405 are communicatively coupled to one another, for example via a local area network or peer-to-peer network.

Initially, the user 401 is located in the monitored room 410C. While in the monitored room 410C, the user 401 issues and audible command which is received (and processed) by the DPA device 405C located in monitored room 410C. As an example, the audible command may be an instruction to output a notification (e.g., alarm) at a specific time. In some embodiments, the DPA device 405C issues a copy of the audible command to the other DPA devices 405 in the home 400 with an indication to perform the audible command whenever the user 401 enters a monitored room 410 associated with that DPA device 405. In other embodiments, the DPA devices 405 collaboratively track the location of the user 401 and the DPA device 405C transfers the audible command to an appropriate DPA device 405 in response to the user 401 entering a monitored room 410 associated with that DPA device 405.

For example, the user 401 may enter a kitchen/dining area corresponding to the monitored room 410B where the DPA device 405B is also located. In this example, the DPA device 405B may detect the presence of the user 401 and inform the DPA device 405C. Here, the DPA device 405C stops performing the audible command and (optionally) transfers the audible command to the DPA device 405B (e.g., the DPA device 405 closest to the location of the user 401). Accordingly, the DPA device 405B begins performing the audible command in response to detecting the presence of the user 401 and/or in response to the DPA device 405C transferring the audible command.

If the user 401 returns to the monitored room 410C, the above steps are reversed with the DPA device 405B stopping performance of the audible command and (optionally) transferring the audible command back to the digital system device 405B. In one embodiment, the user 401 may announce their presence in a monitored room 410 upon entering said room.

As another example, the user 401 may enter a bedroom area corresponding to the monitored room 410D. In certain embodiments, some bedrooms corresponding to monitored rooms 410 may not be associated with the user 401. For example, certain DPA devices 405 within the home 400 may be associated exclusively with a particular user. Thus, when the user 401 enters their own bedroom, a DPA device 405 in that bedroom may accept transfer of an audible command.

However, should the user 401 enter another bedroom, a DPA device 405 in that bedroom may not be associated with the user 401 and therefore does not accept transfer of the audible command. Still further, a DPA device 405 in a bedroom not belonging to the user 401 (and is not associated with the user 401) may accept a transfer of certain types audible commands, such as a request to output alarm/notification at a certain time, but not accept a transfer of other types of audible commands, such as a request to stream audio content (e.g., internet radio). In the depicted embodiment, the DPA device 405D accepts transfer of audible commands associated with the user 401, at the DPA device 405E does not accept transfer of auto complete commands associated with the user 401.

In certain embodiments, the user 401 may be associated with a mobile device that can accept transfer of at least some types of audible commands. For example, a mobile phone carried by the user 401 may be configured to accept transfer of an alarm/notification command. Accordingly, the user 401 may travel from the monitored room 410C to an unmonitored room 411 of the home 400. In response to the networked DPA devices 405 being unable to locate the user 401 (e.g., due to the user 401 not being located in a monitored room 410), the DPA device 405C may transfer the audible command (e.g., alarm/notification command) to the mobile phone. If the networked DPA devices 405 later locate the user 401 (e.g., due to the user 401 entering a monitored room 410), then a DPA device 405 may send a message the mobile phone revoking the audible command.

Figure 5:
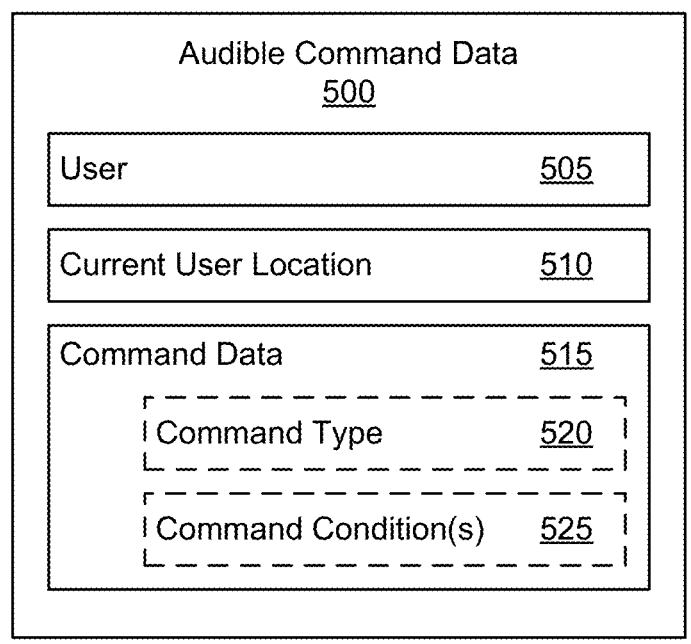
FIG. 5 is a schematic block diagram illustrating one embodiment of a data structure used for outputting audio based on a user's location.

FIG. 5 depicts a data structure for an audible command data 500, according to embodiments of the disclosure. The audible command data 500 may be generated by a digital personal assistant ("DPA") device or DPA manager upon receiving an audible command from a user. In certain embodiments, the DPA device/manager generates the audible command data 500 in response to determining that the auto command is a "location-tracking" command where the command is to "follow" the user as he/she travels to various locations. The audible command data 500 includes various data fields including, but not limited to, a user field 505, a current user location field 510, and a command data field 515.

The user field 505 contains a parameter identifying the particular user associated with the audible command data 500. As discussed above, a DPA device/manager may use audio data, image data, wireless signal data, and other types of data to identify a particular user issuing the audible command. The current user location field 510 contains a parameter indicating the present location of the user identified in the user field 505. The DPA device/manager updates the current user location field 510 whenever the identified user travels to a new (monitored) location. In certain embodiments, a first DPA device corresponding to an initial location of the user transfers the audible command data 500 to a second DPA device corresponding to a new location of the user in response the user traveling to the new location.

The command data field 515 includes various parameters describing the actions to be performed in response to the audible command. Accordingly, the command data field 515 may include a command type parameter 520 and/or one or more command condition parameters 525. Examples of values of the command type parameter 520 include, but are not limited to, an indication to output an alert/notification and an indication stream audio content. The one or more command condition parameters 525 are used to further define the actions to be performed. For example, where the command type parameter 520 indicates an alert/notification, the command condition parameters 525 may indicate a certain time at which the alert/notification is to be output or other conditions to be satisfied before outputting the alert/notification. As another example, where the command type parameter 520 indicate streaming audio output, the command condition parameters 525 may indicate a streaming source, a duration (e.g., limit) for streaming the audio content, or other conditions relating to streaming the audio content.

In certain embodiments, the command condition parameters 525 may include exceptions, such as monitored rooms in which the audio is not to be output. In some embodiments, the command condition parameters 525 may specify one or more default actions to be performed if the user's location cannot be determined. Additionally, a command condition parameter may be used indicate that the user's location is to be tracked and the audible command data 500 transferred to a nearest DPA device.

Figure 6:
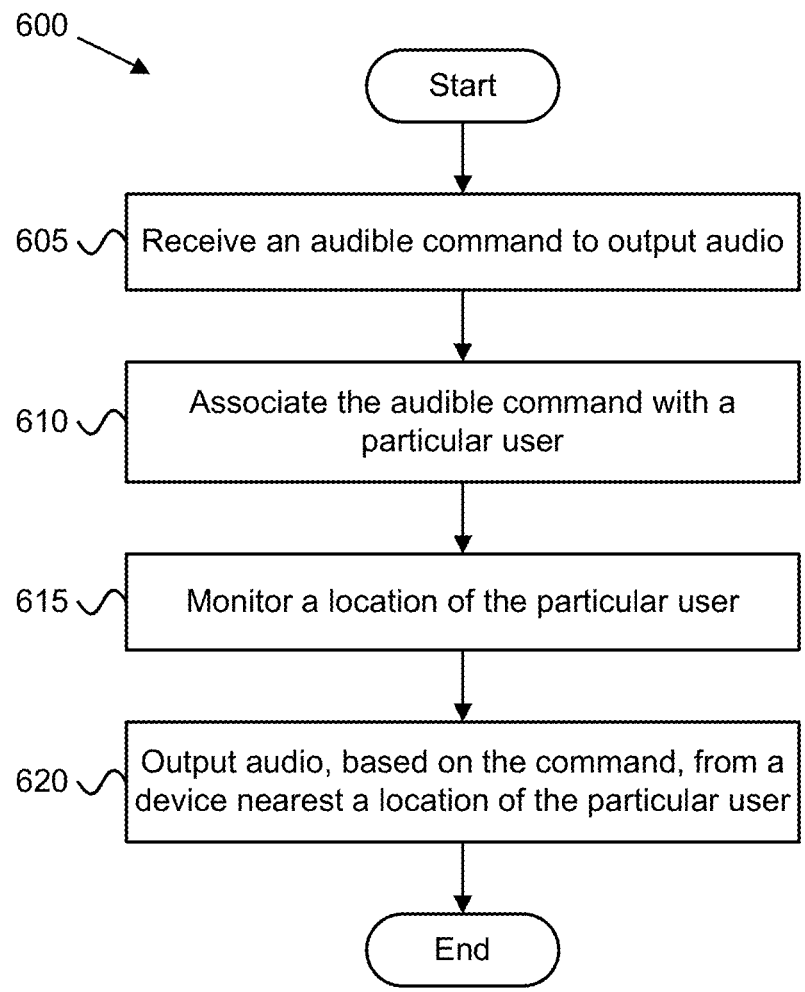
FIG. 6 is a schematic flow chart diagram illustrating one embodiment of a method for outputting audio based on a user's location.

FIG. 6 depicts a method 600 for outputting audio based on a user's location, according to embodiments of the disclosure. In certain embodiments, the method 600 is performed by one of the DPA devices 105-115, by the DPA manager 145, by the digital assistant apparatus 200, by the first digital personal assistant 310, by the second digital personal assistant 325, and/or by a DPA device 405. Alternatively, the method 600 may be performed by a processor and a computer readable storage medium that is not a transitory signal. Here, computer readable storage medium stores code that is executed on the processor to perform the functions of the method 600.

The method 600 begins and receives 605 an audible command to output audio. In one embodiment, the audible command is a command to output a notification at a certain time. In another embodiment, the audible command is a command to output streaming audio content. In certain embodiments, receiving 605 the audible command to output audio may trigger the capturing of image and/or video data, as discussed below.

The method 600 includes associating 610 the audible command with a particular user. In some embodiments, associating 610 the audible command with the particular user includes identifying the particular user from voice analysis of the audible command. In certain embodiments, associating 610 the audible command with the particular user includes capturing image data and identifying the particular user from image data. In other embodiments, associating 610 the audible command with a particular user includes detecting the presence of an electronic device associated with the user, such as a mobile phone, a wearable device, an RFID tag, and the like.

The method 600 includes monitoring 615 a location of the particular user. In some embodiments, monitoring 615 the location of the particular user includes receiving additional audio data and determining whether the user is located in a particular room of a plurality of rooms based on the additional audio data. In such embodiments, receiving the additional audio data may include receiving audio data from one or more of a plurality of stationary digital personal assistant ("DPA") devices, each stationary DPA device being located in a different one of the plurality of rooms. Here, determining that the user is located in a particular one of the plurality of rooms may include detecting the user's voice in the audio data of a particular one of the plurality of stationary DPA devices and determining that the user is located in the room associated with that stationary DPA device.

In some embodiments, monitoring 615 the location of the particular user includes capturing image data and determining that the user is located in a particular room of a plurality of rooms based on the image data. In such embodiments, receiving the image data may include receiving image data from one or more of the plurality of stationary DPA devices, each stationary DPA device being located in a different one of the plurality of rooms. Still further, monitoring 615 the location of the particular user may include receiving wireless signal data (e.g., from onboard sensors and/or one or more DPA devices) and determining the user's location from the wireless signal data.

The method 600 includes outputting 620 audio based on the command from a device nearest a location of the particular user and the method 600 ends. In some embodiments, outputting 620 audio from a device nearest a location of the particular user includes instructing a mobile DPA device associated with the particular user to output the audio in response to determining that the user is not located in any of the plurality of rooms containing a stationary DPA device. In certain embodiments, outputting 620 audio from a device nearest a location of the particular user may include transferring the audible command to the DPA device nearest the user.

For example, receiving 605 the audible command to output audio may include receiving a command to output streaming audio content at a first device. Here, outputting 620 audio based on the command from a device nearest a location of the particular user includes transferring the streaming command to a second device nearest the location of the particular user, the second device being located in a different room than the first device.

As another example, receiving 605 the audible command to output audio may include receiving a command to output a notification at a certain time. Here, outputting 620 audio based on the command from a device nearest a location of the particular user may include transferring the notification command to a second device nearest the location of the particular user, the second device being located in a different room than the first device.

Figure 7:
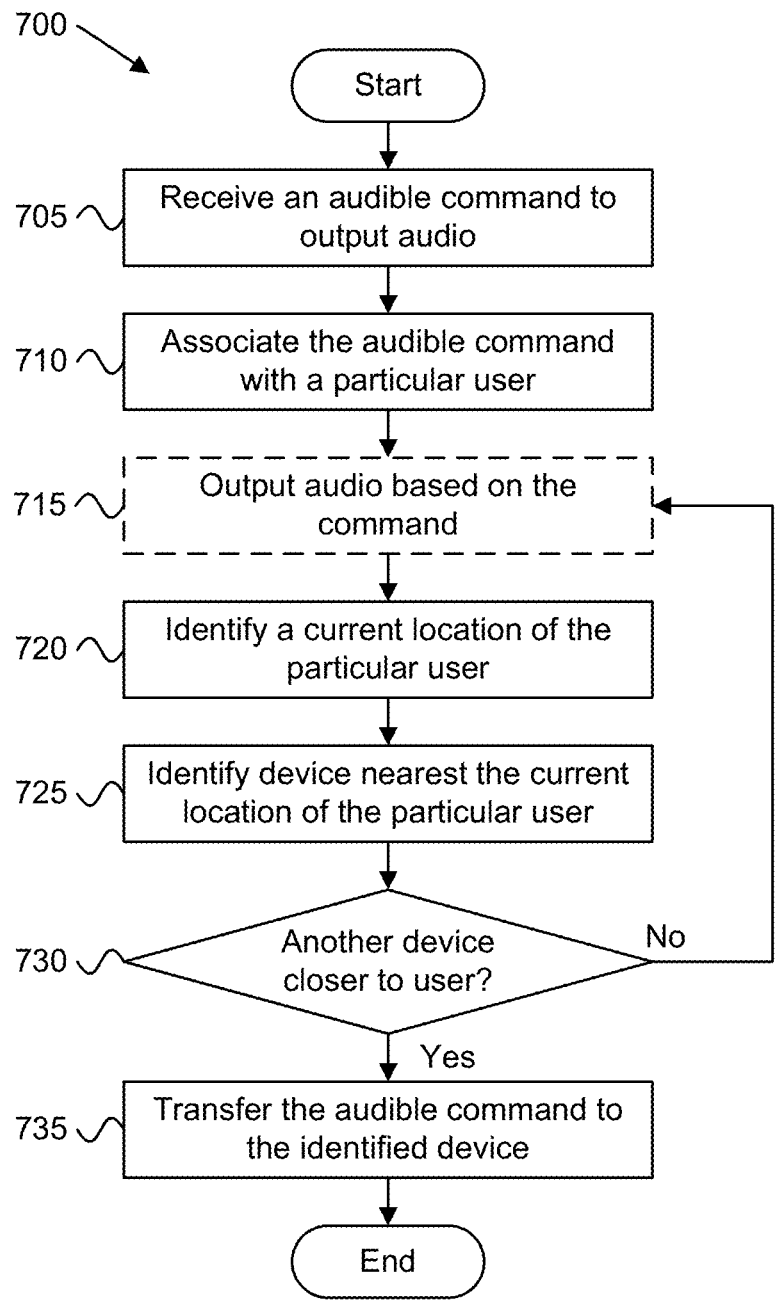
FIG. 7 is a schematic flow chart diagram illustrating another embodiment of a method for outputting audio based on a user's location.

FIG. 7 depicts a method 700 for outputting audio based on a user's location, according to embodiments of the disclosure. In certain embodiments, the method 700 is performed by one of the DPA devices 105-115, by the DPA manager 145, by the digital assistant apparatus 200, by the first digital personal assistant 310, by the second digital personal assistant 325, and/or by a DPA device 405. Alternatively, the method 700 may be performed by a processor and a computer readable storage medium that is not a transitory signal. Here, computer readable storage medium stores code that is executed on the processor to perform the functions of the method 700.

The method 700 begins and receives 705 an audible command to output audio. As described above with reference to FIG. 6, the audible command may be a command to output a notification at a certain time, a command to output streaming audio content, or the like. In certain embodiments, receiving 705 the audible command to output audio may trigger the capturing of image and/or video data, as discussed below.

The method 700 includes associating 710 the audible command with a particular user. As described above with reference to FIG. 6, associating 710 the audible command with the particular user may include identifying the particular user by analyzing a voice in the auto come command, by analyzing image data capture in response the article command, sensing the presence of an electronic device associated with a particular user, and the like.

The method 700 optionally includes outputting 715 audio based on the command. For example, a spoken acknowledgment may be output 715 in response to receiving the audible command. As another example, streaming audio content to be output 715 in response to receiving a command to output streaming audio. Accordingly, the method 700 includes outputting 705 audio based on the command, when appropriate.

The method 700 includes identifying 720 a current location of the particular user. As described above with reference to FIG. 6, identifying 720 a current location of the particular user may include receiving additional audio data, image data, and/or wireless signal data (e.g., from one or more DPA devices) and determining the current location from the additional data. The method 700 further includes identifying a device (e.g., a DPA device) nearest the current location of the particular user.

The method 700 includes determining 730 whether another device is closer to the user. Here it is assumed that the device receiving the audible command is initially the device closest to the user. In response to determining 730 that another device is closer to the user, then the method 700 includes transferring 735 the audible command to the identified device and the method 700 ends. In one embodiment, audible command data 500 is transferred to the identified device.

However, in response to determining 730 that another device is not closer to the user, then the method 700 proceeds to output 715 audio based on the command (e.g., where applicable based on the nature and conditions of audible command), identifies 720 the current location of the particular user, identify 725 a device nearest to the current location of the particular user, and again determine 730 whether another device is closer to the user.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a processor;
   a memory that stores code executable by the processor to:
   receive an audible command to output audio;
   associate the audible command with a particular user;
   monitor a location of the particular user, wherein monitoring the location of the particular user comprises determining whether the user is located in a particular room of a plurality of rooms, each room having a stationary digital personal assistant device located therein; and
   output audio, based on the command, from a device nearest a location of the particular user, wherein outputting audio from a device nearest a location of the particular user comprises instructing a mobile digital personal assistant device associated with the particular user to output the audio in response to determining that the user is not located in any of the plurality of rooms containing a stationary digital personal assistant device.

2. The apparatus of claim 1, wherein outputting audio from a device nearest a location of the particular user comprises the processor identifying the device nearest a location of the particular user and transferring the audible command to the identified device.

3. The apparatus of claim 1, wherein associating the audible command with the particular user comprises identifying the particular user from voice analysis of the audible command.

4. The apparatus of claim 3, wherein monitoring the location of the particular user comprises receiving additional audio data from one or more of the plurality of stationary digital personal assistant devices and determining that the user is located in a particular room of the plurality of rooms based on the additional audio data.

5. The apparatus of claim 1, further comprising a camera device that captures image data, wherein associating the audible command with the particular user comprises the processor identifying the particular user from image data in response to receiving the audible command to output audio.

6. The apparatus of claim 5, wherein monitoring the location of the particular user comprises capturing image data from one or more of the plurality of stationary digital personal assistant devices and determining that the user is located in a particular room of the plurality of rooms based on the additional image data.

7. The apparatus of claim 1, wherein the audible command to output audio is a command to output a notification at a certain time, wherein outputting audio based on the command from a device nearest a location of the particular user comprises transferring the command to output the notification at the certain time to the device nearest the location of the particular user.

8. A method comprising:
   receiving an audible command to output audio;
   associating, by use of a processor, the audible command with a particular user;
   monitoring a location of the particular user, wherein monitoring the location of the particular user comprises determining whether the user is located in a particular room of a plurality of rooms, each room having a stationary digital personal assistant device located therein; and
   outputting audio based on the command from a device nearest a location of the particular user, wherein outputting audio from a device nearest a location of the particular user comprises instructing a mobile digital personal assistant device associated with the particular user to output the audio in response to determining that the user is not located in any of the plurality of rooms containing a stationary digital personal assistant device.

9. The method of claim 8, wherein associating the audible command with the particular user comprises identifying the particular user from voice analysis of the audible command.

10. The method of claim 8, further comprising capturing image data in response to receiving the audible command to output audio, wherein associating the audible command with the particular user comprises identifying the particular user from image data.

11. The method of claim 8, wherein monitoring the location of the particular user comprises receiving additional audio data and determining that the user is located in a particular room of the plurality of rooms based on the additional audio data.

12. The method of claim 11, wherein receiving the additional audio data comprises receiving audio data from one or more of the plurality of stationary digital personal assistant devices.

13. The method of claim 12, wherein determining that the user is located in a particular room of the plurality of rooms based on the additional audio data comprises detecting the users voice in the audio data of a particular one of the plurality of stationary digital personal assistant devices and determining that the user is located in the room associated with the particular one of the plurality of stationary digital personal assistant devices.

14. The method of claim 8, further comprising capturing image data in response to receiving the audible command to output audio, wherein monitoring the location of the particular user comprises determining that the user is located in a particular room of the plurality of rooms based on the image data.

15. The method of claim 14, wherein receiving the image data comprises receiving image data from one or more of the plurality of stationary digital personal assistant devices.

16. The method of claim 8, wherein receiving the audible command to output audio comprises receiving a command to output streaming audio content at a first device, wherein outputting audio based on the command from a device nearest a location of the particular user comprises transferring the command to output streaming audio content to a second device nearest the location of the particular user, the second device being located in a different room than the first device.

17. A program product comprising a computer readable storage medium that is not a transitory signal that stores code executable by a processor, the executable code comprising code to:

receive an audible command to output audio;
correlate the audible command with a particular user;
track a location of the particular user, wherein tracking the location of the particular user comprises determining whether the user is located in a particular room of a plurality of rooms, each room having a stationary digital personal assistant device located therein; and
output audio based on the command from a device nearest a location of the particular user, wherein outputting audio from a device nearest a location of the particular user comprises instructing a mobile digital personal assistant device associated with the particular user to output the audio in response to determining that the user is not located in any of the plurality of rooms containing a stationary digital personal assistant device.

18. The program product of claim 17, wherein the audible command is received at a first device and the audio is output at a second device located in a different room than the first device.

19. The program product of claim 17, wherein the audible command to output audio is a command to output a notification at a specified time, wherein outputting audio based on the command from a device nearest a location of the particular user comprises monitoring a current time and outputting the notification at the device nearest the location of the particular user in response to the current time matching the specified time.

20. The program product of claim 17, wherein the audible command to output audio is a command to output streaming audio content at a first device, wherein outputting audio based on the command from a device nearest a location of the particular user comprises transferring the command to output streaming audio content to a second device nearest the location of the particular user, the second device being located in a different room than the first device.

* * * * *